Patented May 23, 1933

1,909,960

UNITED STATES PATENT OFFICE

EMMET F. HITCH, OF WILMINGTON, DELAWARE, ASSIGNOR TO E. I. DU PONT DE NEMOURS & COMPANY, OF WILMINGTON, DELAWARE, A CORPORATION OF DELAWARE

INTERMEDIATE FOR AZO DYES

No Drawing. Application filed August 6, 1929. Serial No. 383,978.

This invention relates to new compounds for use in the manufacture of azo dyes and more specifically it relates to new derivatives of 2-hydroxy-3-naphthoic acid and to the process of preparing the same.

The object of this invention is to produce a new class of dye intermediates adapted to produce colors of exceptional fastness to washing and light on either animal or vegetable fibers when treated with suitable diazo compounds. A further object is to produce organic compounds having affinity for textile fibers and capable of forming dyes of excellent tinctorial power.

The new compounds may be represented by the general formula:

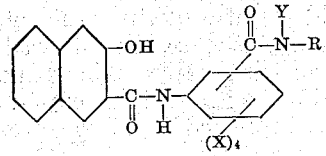

in which X represents hydrogen or a substituent not containing a carboxylic or sulfonic acid group such as an alkyl, alkyl oxy, or halogen substituent, Y represents hydrogen or an aromatic or alkyl substituent, R represents an organic radical of the aliphatic or aromatic series which does not contain a carboxylic or sulfonic acid group.

These compounds may be prepared by condensing nitrobenzoic acids, which do not contain a sulfonic or another carboxylic acid group, or their chlorides or substituted nitro-benzoic acids or their chlorides with a primary or secondary amine of the aliphatic or aromatic series, which amine does not contain a carboxylic or sulfonic acid substituent, or with a mixed aliphatic and aromatic secondary amine, reducing the nitro group of the resulting product and condensing the amino-aroyl-amino compounds thus formed under suitable conditions with 2-hydroxy-3-naphthoic acid.

The new compounds and the method of their preparation can best be disclosed by the presentation of a number of examples of actual embodiments thereof. It is to be understood, of course, that these examples are furnished merely by way of illustration and that the details of procedure set forth therein as well as the particular proportions, reagents, temperatures, etc., therein specified are susceptible of variation and substitution. Such examples follow.

Example 1

Twenty parts of aniline is added drop by drop to a well-agitated soluton of 50 parts of p-nitro-benzoyl chloride in 200 parts of carbon tetrachloride. When the reaction is complete, the carbon tetrachloride is removed by steam distillation and the product filtered and washed well with sodium carbonate solution to remove p-nitro-benzoic acid. The dry product is reduced by heating with 400 parts of alcohol containing 20 parts of hydrochloric acid (36%) and adding 60 parts of iron in small portions. After heating 30 minutes longer, the product is removed from the reduction mass, by rendering alkaline with solid caustic soda while still warm and filtering hot from the iron sludge. Evaporation of most of the alcohol leaves the amino-body as a colorless, crystalline compound. After filtering and drying, 20 parts of the product and 18 parts of 2-hydroxy-3-naphthoic acid are placed in 200 parts of toluene and gradually heated to boiling. At 40° C. four parts of phosphorus trichloride is added and heating continued for 20 to 25 hours. Sodium carbonate solution is then added until alkaline and the toluene is removed by steam distillation. Cooling, filtering, and washing well with water removes the excess 2-hydroxy-3-naphthoic acid.

This compound, which is 2-hydroxy-3-naphthoyl-p-amino-benzanilide, most probably has the structural formula:

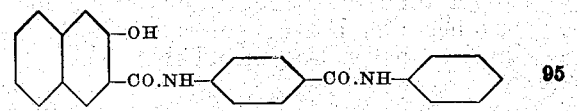

The melting point of this compound when crystallized from chlorobenzene is 291–292° C.

o-anisidine, o-toluidine, 2:5-dichloroaniline or other primary aromatic amines may be used in place of the aniline and m-nitro-benzoyl chloride or other nitro-benzoyl chlorides may be used in place of the p-nitro-benzoyl chloride.

*Example 2*

Twenty parts of n-butylamine is added to 56 parts of p-nitro-benzoyl chloride in 224 parts of carbon tetrachloride as in Example 1. The carbon tetrachloride is removed by steam distillation and the product filtered and washed with sodium carbonate solution to remove any p-nitro-benzoic acid which may have been formed. The product is reduced and condensed with 2-hydroxy-3-naphthoic acid as in Example 1. This compound, which is 2-hydroxy-3-naphthoyl-p-amino-benzoyl-n-butylamine, very probably has the formula:

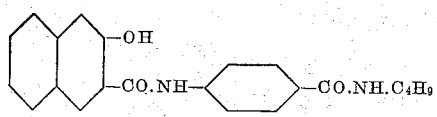

When crystallized from glacial acetic acid, the melting point is 257–258° C.

N-propylamine, isobutylamines, and other aliphatic amines may be used in place of the n-butylamine and m-nitro-benzoyl chloride or other nitro-benzoyl chlorides may be substituted for the p-nitro-benzoyl chloride.

*Example 3*

Thirty parts of monoethylaniline is added to 50 parts of p-nitro-benzoyl chloride in 200 parts of carbon tetrachloride and the mixture is heated for one-half hour. The carbon tetrachloride is steam distilled and the product is filtered and washed with sodium carbonate solution. The nitro-benzoyl-compound is reduced and condensed with 2-hydroxy-3-naphthoic acid as in Example 1.

It very probably has the formula:

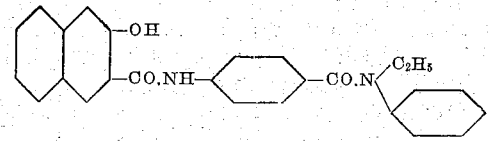

This compound, which is 2-hydroxy-3-naphthoyl-p-amino-benzoyl-monoethylaniline, has a melting point of 271–272° C. when crystallized from glacial acetic acid.

Monomethylaniline or other secondary amines in which one and only one of the radicals is aromatic may be substituted for monoethylaniline and m-nitro-benzoyl chloride or other nitro-benzoyl chlorides may be used in place of p-nitro-benzoyl chloride.

*Example 4*

Thirty parts of beta-naphthylamine is added to 45 parts of p-nitro-benzoyl chloride in 180 parts of carbon tetrachloride and the mixture refluxed for four to five hours. The carbon tetrachloride is steam distilled off and the product is filtered and washed well with sodium carbonate solution. The reduction and condensation with 2-hydroxy-3-naphthoic acid is carried out as in the previous examples.

This compound, which is 2-hydroxy-3-naphthoyl-p-amino-benzoyl-β-naphthylamine, probably has the following structural formula:

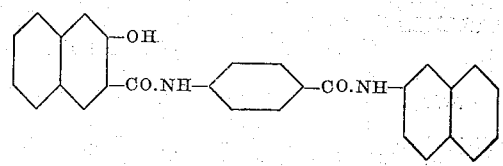

When crystallized from glacial acetic acid, it has a melting point of 292–294° C.

Alpha-naphthylamine or other amines of the naphthalene series may be used in place of the beta-naphthylamine and other nitro-benzoyl chlorides may be substituted for the p-nitro-benzoyl chloride.

*Example 5*

Twenty parts of aniline and 40 parts of 2-nitro-4-toluic acid are placed in 200 parts of toluene. Eight parts of phosphorus trichloride is added and the reaction mixture is heated to boiling for four hours, with mechanical agitation. Sodium carbonate solution is added until alkaline, the toluene distilled off, and the residue filtered off and washed well with water. The reduction and condensation with 2-hydroxy-3-naphthoic acid is accomplished as in the previous examples.

This compound, which is 2-hydroxy-3-naphthoyl-o-amino-p-toluyl-aniline, probably has the structure:

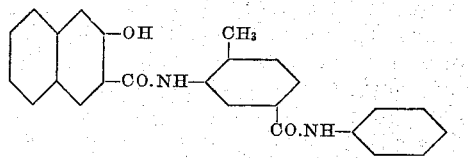

When crystallized from glacial acetic acid, it has a melting point of 261–262° C.

o-toluidine, m-chloroaniline, or other amines may be used in place of the aniline and 3-nitro-4-toluic acid; p-nitro-benzoic acid, 3-nitro-4-chloro-benzoic acid or other nitro-benzoic acids may be substituted for the 2-nitro-4-toluic acid.

The compounds having the general formula given above are not readily soluble in water and most organic solvents, but will dissolve more or less readily in solutions of caustic soda. They may be recrystallized in small quantities from such solvents as glacial acetic acid or nitrobenzene. They will couple with diazo bodies under suitable conditions to form colored azo compounds, some of which are practically insoluble in water and are suitable for pigments. Solutions of these new compounds may be used in the process of dyeing cotton and other textile fabrics by impregnating the fiber in the usual manner and developing the color on the fiber by treatment with suitable diazo compounds.

The presence of carboxylic groups or sulfonic acid groups tends to increase the water solubility of the final dye and hence should be avoided. The dyes obtained from the intermediates having the general formula given above are of exceptional fastness to light and washing. However, the preferred class of products includes those in which Y, in the formula, is either hydrogen or an aliphatic radical and R is an aromatic radical. Of these the products derived from aniline, as illustrated in Example 1, represent the preferred embodiment.

As has already been indicated, the nitrobenzoic acids employed may contain substituent groups with the exception of carboxylic or sulfonic acid groups. However, compounds obtained from the nitro-benzoic acids themselves or from nitro-benzoic acids containing only one alkyl, alkyl oxy, or halogen substituent are preferred to those compounds obtained from nitro-benzoic acids containing other substituents, or more than one of these substituents.

As many apparent and widely different embodiments of this invention may be made without departing from the spirit thereof, it is to be understood that I do not limit myself to the foregoing examples or description except as indicated in the following claims:

I claim:

1. As a new compound, a derivative of 2-hydroxy-3-naphthoic acid, said compound being free from carboxylic or sulfonic acid groups and having the general formula

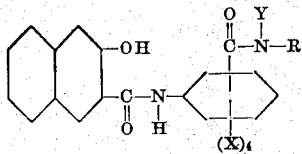

wherein X represents a substituent from the group consisting of hydrogen, alkyl, alkoxy and halogen, R represents a radical of the aliphatic or aromatic series, and Y represents hydrogen, and aromatic radical or an aliphatic radical.

2. As a new compound, a derivative of 2-hydroxy-3-naphthoic acid, said compound being free from carboxylic or sulfonic acid groups and having the general formula

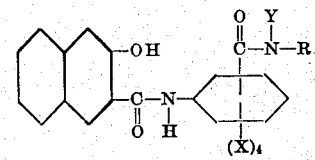

wherein X represents hydrogen or an alkyl, alkyl oxy, or halogen substituent, Y represents hydrogen or an alkyl group, and R represents an organic radical of the aliphatic or aromatic series.

3. As a new compound, a derivative of 2-hydroxy-3-naphthoic acid, said compound being free from carboxylic or sulfonic acid groups and having the general formula

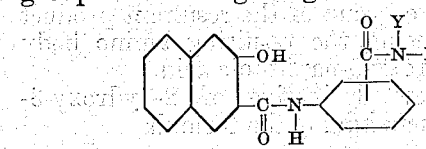

wherein Y represents hydrogen or an alkyl group, and R represents an organic radical of the aromatic series.

4. As a new compound, a derivative of 2-hydroxy-3-naphthoic acid, said compound being free of carboxylic or sulfonic acid groups and having the general formula

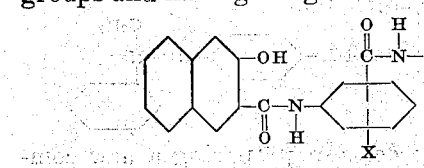

wherein X represents H or an alkyl, alkyl oxy, or halogen substituent, and R represents an organic radical of the aromatic series.

5. A new derivative of 2-hydroxy-3-naphthoic acid having the formula

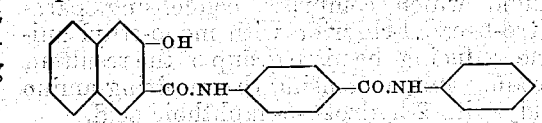

6. A process of preparing a new compound which comprises condensing a nitro-benzoic acid not containing a sulfonic or another carboxylic acid group with an amine of the class consisting of primary and secondary amines of the aliphatic or aromatic series which amines do not contain a carboxylic or sulfonic acid substituent, reducing the nitro group of the resultant product and condensing the amino-aroyl-amino compound thus formed with 2-hydroxy-3-naphthoic acid.

7. The process of preparing a new compound which comprises condensing a nitro-benzoic acid not containing a sulfonic or another carboxylic acid group with an amine not containing a carboxylic or sulfonic acid group and of the class consisting of primary and secondary amines of the aliphatic series, primary amines of the aromatic series, and mixed aliphatic and aromatic secondary amines, reducing the nitro group of the resultant product and condensing the amino-aroyl-amino compound thus formed with 2-hydroxy-3-naphthoic acid.

8. The process of preparing a new compound which comprises condensing a nitrobenzoic acid not containing a sulfonic or another carboxylic acid group with a primary aromatic amine, reducing the nitro group of the resultant product and condensing the amino-aroyl-amino compound thus formed with 2-hydroxy-3-naphthoic acid.

9. The process of preparing a new compound which comprises condensing para-nitro-benzoyl-chloride with aniline, reducing the nitro group of the resultant product and condensing the resulting amino body with 2-hydroxy-3-naphthoic acid.

10. A new derivative of 2-hydroxy-3-naphthoic acid having the formula

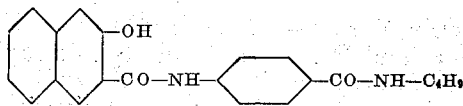

11. A new derivative of 2-hydroxy-3-naphthoic acid having the formula

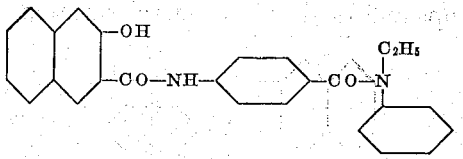

12. The process of preparing a new compound which comprises condensing para-nitro-benzoyl-chloride with n-butyl amine, reducing the nitro group of the resultant product and condensing the resulting amino body with 2-hydroxy-3-naphthoic acid.

13. The process of preparing a new compound which comprises condensing para-nitro-benzoyl-chloride with mono-ethyl aniline, reducing the nitro group of the resultant product and condensing the resulting amino body with 2-hydroxy-3-naphthoic acid.

In testimony whereof, I affix my signature.

EMMET F. HITCH.